United States Patent
Song (10) Patent No.: US 8,159,563 B2
(45) Date of Patent: Apr. 17, 2012

(54) DIGITAL PHOTOGRAPHING APPARATUS, METHOD OF CONTROLLING THE SAME, AND RECORDING MEDIUM STORING COMPUTER PROGRAM FOR EXECUTING THE METHOD

(75) Inventor: Won-seok Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 355 days.

(21) Appl. No.: 12/423,143

(22) Filed: Apr. 14, 2009

(65) Prior Publication Data

US 2009/0262220 A1  Oct. 22, 2009

(30) Foreign Application Priority Data

Apr. 21, 2008  (KR) .................. 10-2008-0036847

(51) Int. Cl.
*H04N 5/262* (2006.01)
(52) U.S. Cl. .................................................. 348/240.1
(58) Field of Classification Search ............. 348/240.99, 348/240.1
See application file for complete search history.

(56) References Cited

U.S. PATENT DOCUMENTS

| | | | |
|---|---|---|---|
| 7,920,180 B2* | 4/2011 | Stavely et al. ............. | 348/240.2 |
| 2003/0025810 A1* | 2/2003 | Pilu et al. ....................... | 348/239 |
| 2004/0046885 A1* | 3/2004 | Regan et al. ............. | 348/333.11 |
| 2005/0219386 A1* | 10/2005 | Stavely et al. ............. | 348/240.3 |
| 2008/0246852 A1* | 10/2008 | Mori ........................... | 348/222.1 |
| 2009/0066833 A1* | 3/2009 | Helwegen et al. ............. | 348/347 |

FOREIGN PATENT DOCUMENTS

| | | |
|---|---|---|
| JP | 2001-042200 A1 | 2/2001 |
| JP | 2005-301269 A1 | 10/2005 |
| KR | 10-2006-0035198 A | 4/2006 |

* cited by examiner

*Primary Examiner* — Lin Ye
*Assistant Examiner* — Amy Hsu
(74) *Attorney, Agent, or Firm* — Drinkle Biddle & Reath LLP (57) ABSTRACT

Provided are a digital photographing apparatus having a zoom function, which may easily obtain still images having various viewing angles, a method of controlling the same, and a recording medium storing a computer program for executing the method. The digital photographing apparatus obtains data regarding a first still image at a first zoom ratio, and then automatically obtains data regarding a second still image at a second zoom ratio that is different from the first zoom ratio.

21 Claims, 6 Drawing Sheets

FIG. 3
LOCUS DATA

DIGITAL PHOTOGRAPHING APPARATUS, METHOD OF CONTROLLING THE SAME, AND RECORDING MEDIUM STORING COMPUTER PROGRAM FOR EXECUTING THE METHOD

CROSS-REFERENCE TO RELATED PATENT APPLICATION

This application claims the benefit of Korean Patent Application No. 10-2008-0036847, filed on Apr. 21, 2008, in the Korean Intellectual Property Office, the disclosure of which is incorporated herein in its entirety by reference.

BACKGROUND

1. Field of the Invention

The present invention relates to a digital photographing apparatus, a method of controlling the same, and a recording medium storing a computer program for executing the method, and more particularly, to a digital photographing apparatus that may easily obtain still images having various viewing angles, a method of controlling the same, and a recording medium storing a computer program for executing the method.

2. Description of the Related Art

In general, a digital photographing apparatus stores data regarding images which are obtained through a photographing operation in a photographing mode, in a storage medium, and displays images on a display unit by using the data stored in the storage medium. In particular, digital photographing apparatuses having a zoom function have currently become very popular nowadays due to their convenience of, for example, composition.

However, in a conventional digital photographing apparatus having a zoom function, a user has to determine a zoom ratio and to determine composition in accordance with the zoom ratio, before obtaining data regarding a still image. Thus, inconvenience is caused because, after the data regarding the still image is already obtained, the user has to change the zoom ratio into a different zoom ratio and to again form a new composition in order to obtain data regarding the still image having the new composition determined in accordance with the different zoom ratio.

SUMMARY

The present invention provides a digital photographing apparatus that may easily obtain still images having various viewing angles, a method of controlling the same, and a recording medium storing a computer program for executing the method.

According to an aspect of the present invention, there is provided a digital photographing apparatus having a zoom function, wherein the photographing apparatus obtains data regarding a first still image at a first zoom ratio, and then automatically obtains data regarding a second still image at a second zoom ratio that is different from the first zoom ratio.

The data regarding the first still image may be obtained in accordance with a signal input from a user, and the data regarding the second still image may be obtained without an additional signal input from the user.

Data regarding a third still image may be automatically obtained at a third zoom ratio that is different from the first and second zoom ratios, after the data regarding the second still image is obtained.

The data regarding the first still image may be obtained in accordance with a signal input from a user, and the data regarding the second and third still images may be obtained without additional signals input from the user.

If the first zoom ratio is greater than a minimum zoom ratio or a first preset zoom ratio of the digital photographing apparatus, and is less than a maximum zoom ratio or a second preset zoom ratio of the digital photographing apparatus, one of second and third zoom ratios may be a zoom ratio less than the first zoom ratio and the other of the second and third zoom ratios may be a zoom ratio greater than the first zoom ratio.

If the first zoom ratio is greater than the minimum zoom ratio or the first preset zoom ratio of the digital photographing apparatus, and is less than the maximum zoom ratio or the second preset zoom ratio of the digital photographing apparatus, and if the first zoom ratio is relatively closer to the maximum zoom ratio of the digital photographing apparatus than to the minimum zoom ratio of the digital photographing apparatus, the zoom ratio greater than the first zoom ratio may be used as the second zoom ratio and the zoom ratio less than the first zoom ratio may be used as the third zoom ratio.

If the first zoom ratio is greater than the minimum zoom ratio or the first preset zoom ratio of the digital photographing apparatus, and is less than the maximum zoom ratio or the second preset zoom ratio of the digital photographing apparatus, and if the first zoom ratio is relatively closer to the minimum zoom ratio of the digital photographing apparatus than to the maximum zoom ratio of the digital photographing apparatus, the zoom ratio less than the first zoom ratio may be used as the second zoom ratio and the zoom ratio greater than the first zoom ratio may be used as the third zoom ratio.

The digital photographing apparatus may include a face detection unit determining whether a face is included in the first still image that is obtained or to be obtained, and, if the face detection unit detects the face, the second and third zoom ratios may be the same as or less than the zoom ratio including a whole face in the first still image.

If the first zoom ratio is a minimum zoom ratio or a zoom ratio less than a preset zoom ratio of the digital photographing apparatus, a zoom ratio greater than the first zoom ratio may be used as the second zoom ratio and a zoom ratio greater than the second zoom ratio may be used as the third zoom ratio.

The digital photographing apparatus may include a face detection unit determining whether a face is included in the first still image that is obtained or to be obtained, and, if the face detection unit detects the face, a zoom ratio including a whole face in the first still image or a zoom ratio less than the zoom ratio including the whole face in the first still image may be used as each of the second and third zoom ratios.

If the first zoom ratio is a maximum zoom ratio or a zoom ratio greater than a preset zoom ratio of the digital photographing apparatus, a zoom ratio less than the first zoom ratio may be used as the second zoom ratio and a zoom ratio less than the second zoom ratio may be used as the third zoom ratio.

Auto-focusing may be performed on a subject when the data regarding the first still image is obtained, and, when data regarding another still image that is not the first still image is obtained, additional auto-focusing may be not performed and information on the auto-focusing performed when the data regarding the first still image is obtained may be used.

According to another aspect of the present invention, there is provided a method of controlling a digital photographing apparatus having a zoom function, the method including (a) obtaining data regarding a first still image at a first zoom ratio; and (b) automatically obtaining data regarding a second still image at a second zoom ratio that is different from the first zoom ratio, after (a) is performed.

(A) may be performed in accordance with a signal input from a user, and (b) may be performed without an additional signal input from the user.

The method may further include automatically obtaining data regarding a third still image at a third zoom ratio that is different from the first and second zoom ratios, after (b) is performed.

(A) may be performed in accordance with a signal input from a user, and (b) and (c) may be performed without additional signals input from the user.

If the first zoom ratio is greater than a minimum zoom ratio or a first preset zoom ratio of the digital photographing apparatus, and is less than a maximum zoom ratio or a second preset zoom ratio of the digital photographing apparatus, one of second and third zoom ratios may be a zoom ratio less than the first zoom ratio and the other of the second and third zoom ratios may be a zoom ratio greater than the first zoom ratio.

If the first zoom ratio is greater than the minimum zoom ratio or the first preset zoom ratio of the digital photographing apparatus, and is less than the maximum zoom ratio or the second preset zoom ratio of the digital photographing apparatus, and if the first zoom ratio is relatively closer to the maximum zoom ratio of the digital photographing apparatus than to the minimum zoom ratio of the digital photographing apparatus, the zoom ratio greater than the first zoom ratio may be used as the second zoom ratio and the zoom ratio less than the first zoom ratio may be used as the third zoom ratio.

If the first zoom ratio is greater than the minimum zoom ratio or the first preset zoom ratio of the digital photographing apparatus, and is less than the maximum zoom ratio or the second preset zoom ratio of the digital photographing apparatus, and if the first zoom ratio is relatively closer to the minimum zoom ratio of the digital photographing apparatus than to the maximum zoom ratio of the digital photographing apparatus, the zoom ratio less than the first zoom ratio may be used as the second zoom ratio and the zoom ratio greater than the first zoom ratio may be used as the third zoom ratio.

The method may further include determining whether a face is included in the first still image, before or when data regarding the first still image is obtained, and, if it is determined that the face is included in the first still image, the second and third zoom ratios may be the same as or less than the zoom ratio including a whole face in the first still image.

If the first zoom ratio is a minimum zoom ratio or a zoom ratio less than a preset zoom ratio of the digital photographing apparatus, a zoom ratio greater than the first zoom ratio may be used as the second zoom ratio and a zoom ratio greater than the second zoom ratio may be used as the third zoom ratio.

The method may further include determining whether a face is included in the first still image, before or when data regarding the first still image is obtained, and, if it is determined that the face is included in the first still image, a zoom ratio including a whole face in the first still image or a zoom ratio less than the zoom ratio including the whole face in the first still image may be used as each of the second and third zoom ratios.

If the first zoom ratio is a maximum zoom ratio or a zoom ratio greater than a preset zoom ratio of the digital photographing apparatus, a zoom ratio less than the first zoom ratio may be used as the second zoom ratio and a zoom ratio less than the second zoom ratio may be used as the third zoom ratio.

(A) may include performing auto-focusing on a subject, and additional auto-focusing may be not performed and information on the auto-focusing performed in (a) may be used when data regarding a still image is obtained in another operation that is not (a).

According to another aspect of the present invention, there is provided a recording medium storing a computer program for executing the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Hereinafter, the present invention will be described in detail by explaining embodiments of the invention with reference to the attached drawings.

Figure 1:
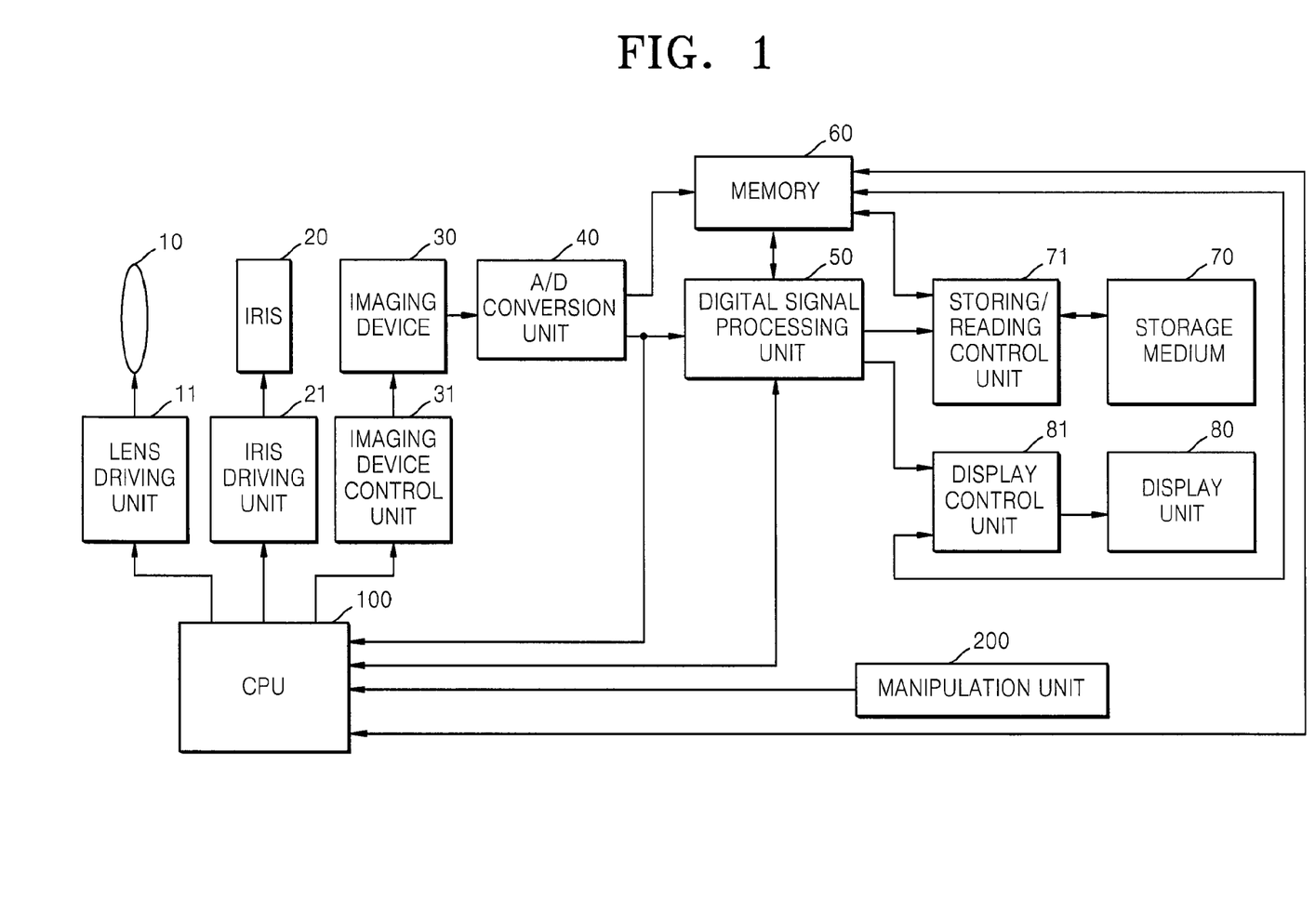
FIG. 1 is a schematic block diagram of a digital photographing apparatus according to an embodiment of the present invention.
Figure 2A:
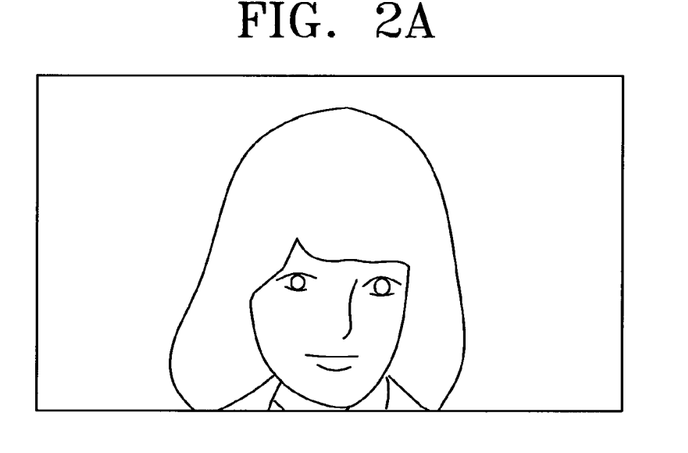
FIGS. 2A through 2C are pictorial illustrations of still images which may be obtained by the digital photographing apparatus illustrated in FIG. 1.
Figure 2B:
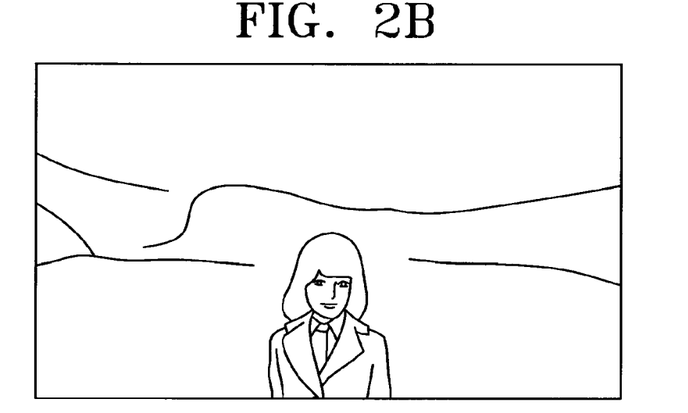
Figure 2C:
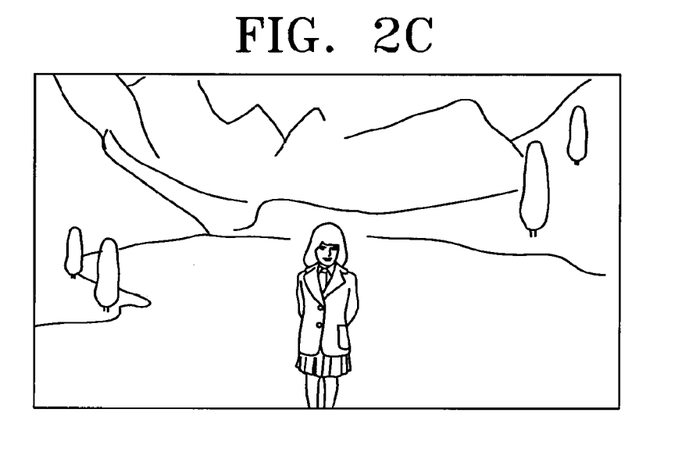

FIG. 1 is a schematic block diagram of a digital photographing apparatus according to the present invention. FIGS. 2A through 2C are conceptual views of still images which may be obtained by the digital photographing apparatus illustrated in FIG. 1.

Referring to FIG. 1, general operation of the digital photographing apparatus is managed by a central processing unit (CPU) 100 and the digital photographing apparatus includes a manipulation unit 200 including, for example, keys for generating electric signals based on a user's input. The electric signals generated by the manipulation unit 200 are transmitted to the CPU 100 so that the CPU 100 may control the digital photographing apparatus in accordance with the electric signals.

In a photographing mode, when an electric signal based on a user's input is applied to the CPU 100, the CPU 100 controls a lens driving unit 11, an iris driving unit 21, and an imaging device control unit 31 so as to respectively adjust a position of a lens unit 10, an opening degree of an iris 20, and sensitivity of an imaging device 30, in accordance with the electric signal. In FIG. 1, one lens driving unit 11 and one lens are illustrated for convenience of explanation. However, different configurations are also allowed. For example, a zoom lens and a focusing lens may be separately included in the lens unit 10 and a zoom lens driving unit and a focusing lens driving unit may be separately included as the lens driving unit 11.

The imaging device 30 creates data regarding an image obtained from input light and an analog/digital (A/D) conversion unit 40 converts analog data output from the imaging device 30, into digital data. The A/D conversion unit 40 may not be included in accordance with characteristics of the imaging device 30, e.g. if the imaging device is a digital device.

The data generated by the imaging device 30 may be input to a digital signal processing unit 50 through a memory 60 or may be directly input to the digital signal processing unit 50. When necessary, the data may be input to the CPU 100. Here, examples of the memory 60 include read-only memory (ROM) and random access memory (RAM). When necessary, the digital signal processing unit 50 may perform digital signal processing such as gamma correction and white balance adjustment.

The data output from the digital signal processing unit 50 may be transmitted to a display control unit 81 through the memory 60 or may be directly transmitted. The display control unit 81 controls a display unit 80 so as to display an image on the display unit 80. The data output from the digital signal processing unit 50 is input to a storing/reading control unit 71 through the memory 60 or may be directly input. The storing/reading control unit 71 stores the data in a storage medium 70 in accordance with a signal based on a user's input or may automatically store the data. The storing/reading control unit 71 may read data regarding an image, from an image file stored in the storage medium 70, and input the data to the display control unit 81 through the memory 60 or by any other path so as to display the image on the display unit 80. The storage medium 70 may be detachable from the digital photographing apparatus or may be permanently fixed in the digital photographing apparatus.

First Embodiment

The digital photographing apparatus according to a first embodiment of the present invention has a zoom function. When data regarding a still image is obtained in a photographing mode, data regarding a first still image is obtained at a first zoom ratio and then data regarding a second still image is automatically obtained at a second zoom ratio that is different from the first zoom ratio. In more detail, the digital photographing apparatus according to the current embodiment of the present invention obtains the data regarding the first still image at the first zoom ratio set by a user, in accordance with a signal input from the user, and then automatically obtains the data regarding the second still image at the second zoom ratio that is different from the first zoom ratio.

For example, if a user sets the first zoom ratio in order to obtain data regarding a still image of a full face shot, as illustrated in FIG. 2A, and performs a photographing operation, the digital photographing apparatus obtains the data regarding the first still image as illustrated in FIG. 2A. Then, the digital photographing apparatus automatically changes the first zoom ratio into a second zoom ratio having, for example, a wider angle than the first zoom ratio as illustrated in FIG. 2B and thus obtains the data regarding the second still image further including a background, as illustrated in FIG. 2B. Accordingly, the user obtains the first and second still images with regard to the same subject or similar subjects, which are respectively obtained at different zoom ratios such as the first and second zoom ratios, through one manipulation. In this case, the data regarding the first still image is obtained in accordance with the signal input from the user and the data regarding the second still image is automatically obtained without an additional signal input from the user.

In a conventional digital photographing apparatus having a zoom function, a user has to determine a zoom ratio and to determine composition in accordance with the zoom ratio, before obtaining data regarding a still image. Thus, inconvenience is caused because, after the data regarding the still image has already been obtained, the user has to change the zoom ratio into a different zoom ratio and to again determine a composition in order to obtain data regarding the still image having the new composition determined in accordance with the different zoom ratio.

In particular, when a photographing operation is performed in a dynamic situation instead of a static situation in which a subject does not move quickly or often, if the conventional digital photographing apparatus is used, data regarding desired still images may not be obtained due to a large time lapse between when the data regarding the first still image is obtained at the first zoom ratio until when the user adjusts the first zoom ratio and then obtains the data regarding the second still image at the second zoom ratio.

However, the digital photographing apparatus according to the current embodiment of the present invention obtains the data regarding the first still image at the first zoom ratio set by the user, in accordance with the signal input from the user, and then automatically obtains the data regarding the second still image at the second zoom ratio that is different from the first zoom ratio. Accordingly, the user may obtain the first and second still images with regard to the same subject or similar subjects, which are respectively obtained at different zoom ratios such as the first and second zoom ratios, through one manipulation and thus the user's convenience may be maximized.

Also, since the data regarding the second still image is automatically obtained at the second zoom ratio after the data regarding the first still image is obtained at the first zoom ratio, a time interval between a point of time when the data regarding the first still image is obtained and a point of time when the data regarding the second still image is obtained, may be minimized and thus the user may obtain still images including subjects as he/she desires.

Second Embodiment

The digital photographing apparatus according to a second embodiment of the present invention may further automatically obtain data regarding a third still image at a third zoom ratio that is different from first and second zoom ratios, after data regarding the first and second still images are respectively obtained at the first and second zoom ratios as in the digital photographing apparatus according to the first embodiment of the present invention. For example, the data regarding the third still image may be obtained at a third zoom ratio having a wider angle than the first and second zoom ratios, as illustrated in FIG. 2C, after the data regarding the second still image is obtained at the second zoom ratio as illustrated in FIG. 2B. In this case, the first through third still images are respectively obtained at the first through third zoom ratios in accordance with a signal input from a user.

Accordingly, the user may obtain still images at various zoom ratios and thus the user's convenience may be maximized. In this case, the data regarding the first still image is obtained in accordance with the signal input from the user and the data regarding the second and third still images are automatically obtained without additional signals input from the user. In addition, various changes may be made here. For example, data regarding a fourth or more still images may be further obtained at a fourth or more corresponding zoom ratios that are different from the first through third zoom ratios. However, for convenience of explanation, embodiments of the present invention to be described later will be described with regard to a digital photographing apparatus obtaining first through third still images.

The digital photographing apparatus according to the current embodiment of the present invention performs auto-focusing on a subject when the first zoom ratio is set by the user and prior to the data regarding the first still image being obtained at the first zoom ratio as illustrated in FIG. 2A. However, when data regarding other still images which are not the first still image, are obtained, the digital photographing apparatus according to the current or previous embodiment of the present invention does not perform the auto-focusing and may use information on the auto-focusing performed when the data regarding the first still image is obtained. This is because, in general, if the auto-focusing is performed at each zoom ratio, the amount of time required to obtain the data regarding the other still images which are not the first still image may be dramatically increased.

Figure 3:
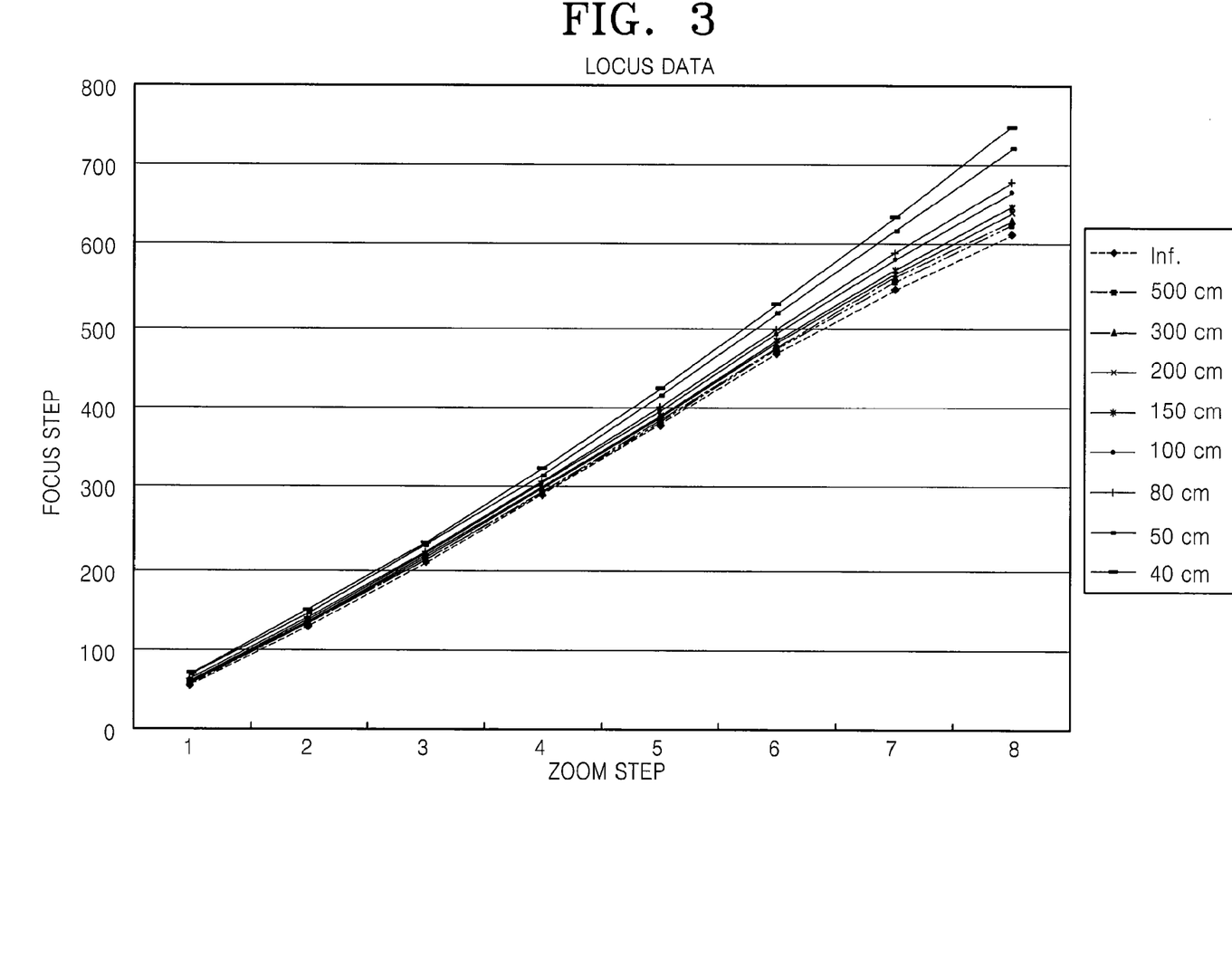
FIG. 3 is a graph showing a focus step in accordance with a zoom ratio for auto focusing, according to an embodiment of the present invention.

FIG. 3 is a graph showing a focus step in accordance with a zoom ratio for auto-focusing, according to an embodiment of the present invention.

In FIG. 3, a horizontal axis represents a zoom step and a vertical axis represents the focus step. In general, a digital photographing apparatus having a 3× optical zoom function divides a zoom into eight steps and has seven zoom-in operations between a maximum wide-angle zoom ratio (a first zoom step) to a maximum telescopic zoom ratio (an eighth zoom step). Each zoom-in operation is performed between two neighboring zoom steps. The digital photographing apparatus changes a position of a lens (focusing lens) in order to perform focusing. A size of the changing of the position of the lens is referred to as a focus step and the position of the lens for auto-focusing in accordance with a distance to a subject may be represented as a focus step value. In essence, the graph of FIG. 3 represents how much the position of the lens has to be changed for the auto-focusing if a zoom ratio is changed from the first zoom step to the eighth zoom step when a distance from the digital photographing apparatus to the subject is 40 cm, 50 cm, 80 cm, 100 cm, 150 cm, 200 cm, 300 cm, 500 cm, or infinity.

The graph of FIG. 3 may be represented as Table 1 below.

TABLE 1

| Distance to subject | At 1st Step | At 2nd Step | At 3rd Step | At 4th Step | At 5th Step | At 6th Step | At 7th Step | At 8th Step |
|---|---|---|---|---|---|---|---|---|
| Inf. | 56 | 129 | 208 | 291 | 378 | 466 | 547 | 615 |
| 500 cm | 58 | 131 | 210 | 294 | 382 | 471 | 555 | 626 |
| 300 cm | 58 | 132 | 211 | 296 | 384 | 474 | 560 | 632 |
| 200 cm | 59 | 134 | 213 | 298 | 387 | 479 | 565 | 641 |
| 150 cm | 60 | 135 | 215 | 300 | 390 | 483 | 571 | 649 |
| 100 cm | 62 | 137 | 218 | 305 | 396 | 491 | 583 | 667 |
| 80 cm | 64 | 139 | 220 | 308 | 401 | 497 | 592 | 680 |
| 50 cm | 68 | 145 | 228 | 317 | 414 | 516 | 619 | 720 |
| 40 cm | 71 | 148 | 232 | 324 | 423 | 528 | 637 | 747 |

For example, if a first zoom ratio is a zoom ratio at a third zoom step, the distance from the digital photographing apparatus to the subject is 100 cm, and a second zoom ratio is a zoom ratio at a fifth zoom step, when data regarding a second still image is automatically obtained after data regarding a first still image is obtained in accordance with a signal input from a user, after auto-focusing is performed at the first zoom ratio, additional auto-focusing is not performed for the second still image. Instead, in the case when the distance from the digital photographing apparatus to the subject is 100 cm, if the position of the lens (focusing lens) is changed by 178 focus steps which is the difference between the 218 focus step position at the third zoom step, and the 396 focus step position at the fifth zoom step, then the auto-focusing at the second zoom ratio, can be automatically performed.

In this manner, the digital photographing apparatus according to the first and second embodiments of the present invention may minimize the time interval between when the data regarding the first still image is obtained until when data regarding another still image is obtained or data regarding other images are obtained. The same effect is applied to other embodiments of the present invention to be described later and various changes thereof. A different digital photographing apparatus may have different characteristics regarding the graph of FIG. 3 and Table 1 and these characteristics may be stored in a component such as the memory 60 illustrated in FIG. 1.

Third Embodiment

A digital photographing apparatus according to a third embodiment of the present invention obtains data regarding first through third images as in the digital photographing apparatus according to the second embodiment of the present invention. However, the digital photographing apparatus according to the current embodiment of the present invention uses a different zoom ratio adjustment method.

Initially, the data regarding the first still image is obtained at a first zoom ratio in accordance with a signal input from a user. In this case, if the first zoom ratio is greater than a minimum zoom ratio (herein referred to as "a maximum wide-angle zoom ratio") or a preset wide-angle zoom ratio of the digital photographing apparatus, and is less than a maximum zoom ratio (herein referred to as "a maximum telescopic zoom ratio") or a preset telescopic zoom ratio of the digital photographing apparatus, one of second and third zoom ratios is a zoom ratio having a wider angle than the first zoom ratio and the other of the second and third zoom ratios is a zoom ratio having a more telescopic angle than the first zoom ratio.

In this case, if the data regarding the first still image is obtained at the first zoom ratio in accordance with the signal input from the user, as illustrated in FIG. 2B, the second and third still images respectively and automatically obtained at the second and third zoom ratios are as illustrated in FIGS. 2A and 2C. As such, the user may obtain a still image at a desired zoom ratio, a still image at a zoom ratio having a wider angle than the desired zoom ratio, and a still image at a zoom ratio having a more telescopic angle than the desired zoom ratio, through one manipulation. Then the user may choose a desired still image at a later time, thus increasing the user's convenience and improving the chance of obtaining a preferable picture(s).

If the user obtains the first still image at the first zoom ratio by using a conventional digital photographing apparatus, as illustrated in FIG. 2B, the user may obtain the second still image as illustrated in FIG. 2A, by modifying the data regarding the first still image. However, in this case, the user has to perform a complicated operation in order to modify the data regarding the first still image into the second still image as illustrated in FIG. 2A. Also, if the user obtains the first still image at the first zoom ratio by using the conventional digital photographing apparatus, as illustrated in FIG. 2B, although the data regarding the first still image is modified, the user will not be able to obtain a still image at the zoom ratio having a wider angle than the first zoom ratio, as illustrated in FIG. 2C.

However, in the digital photographing apparatus according to the current embodiment of the present invention, if the first still image is obtained as illustrated in FIG. 2B by capturing a subject at the first zoom ratio in accordance with the signal input from the user, data regarding still images are automatically obtained at the zoom ratio having a more telescopic angle than the first zoom ratio and the zoom ratio having a wider angle than the first zoom ratio, as illustrated in FIGS. 2A and 2C, respectively. Thus, the user may obtain a still image having a more telescopic angle than the first still image without performing a complicated operation in order to modify the data regarding the first still image, and may also obtain a still image at the zoom ratio having a wider angle than the first zoom ratio of the first still image, which cannot be obtained by using the conventional digital photographing apparatus without performing additional and possibly complicated operations.

Fourth Embodiment

A digital photographing apparatus according to a fourth embodiment of the present invention obtains data regarding a first still image at a first zoom ratio as in the digital photographing apparatus according to the third embodiment of the present invention and then, if the first zoom ratio is greater than a maximum wide-angle zoom ratio or a preset wide-angle zoom ratio of the digital photographing apparatus, and is less than a maximum telescopic zoom ratio or a preset telescopic zoom ratio of the digital photographing apparatus, obtains data regarding second and third still images respectively at a zoom ratio having a wider angle than the first zoom ratio and a zoom ratio having a more telescopic angle than the first zoom ratio.

In this case, after the data regarding the first still image is obtained at the first zoom ratio, the digital photographing apparatus according to the current embodiment of the present invention determines which one is used as a second zoom ratio from among the zoom ratio having a wider angle than the first zoom ratio and the zoom ratio having a more telescopic angle than the first zoom ratio, as described below.

Initially, if the first zoom ratio set by a user is relatively closer to the maximum telescopic zoom ratio of the digital photographing apparatus than to the maximum wide-angle zoom ratio of the digital photographing apparatus, the zoom ratio having a more telescopic angle than the first zoom ratio is used as the second zoom ratio and the zoom ratio having a wider angle than the first zoom ratio is used as a third zoom ratio. This is because a position of a lens (zoom lens) needs to be changed in order to change zoom ratios, and, if the first zoom ratio set by the user is relatively closer to the maximum telescopic zoom ratio of the digital photographing apparatus than to the maximum wide-angle zoom ratio of the digital photographing apparatus, then a movement distance when the lens (zoom lens) moves from a position corresponding to the first zoom ratio to a position corresponding to a zoom ratio greater than the first zoom ratio (the zoom ratio having a more telescopic angle than the first zoom ratio) and then to a position corresponding to a zoom ratio less than the first zoom ratio (the zoom ratio having a wider angle than the first zoom ratio) is less than a movement distance when the lens (zoom lens) moves from the position corresponding to the first zoom ratio to the position corresponding to the zoom ratio less than the first zoom ratio (the zoom ratio having a wider angle than the first zoom ratio) and then to the position corresponding to the zoom ratio greater than the first zoom ratio (the zoom ratio having a more telescopic angle than the first zoom ratio). As such, the data regarding the first through third still images may be rapidly obtained.

On the other hand, if the first zoom ratio set by the user is relatively closer to the maximum wide-angle zoom ratio of the digital photographing apparatus than to the maximum telescopic zoom ratio of the digital photographing apparatus, then the zoom ratio having a wider angle than the first zoom ratio is used as the second zoom ratio and the zoom ratio having a more telescopic angle than the first zoom ratio is used as the third zoom ratio. This is because, if the first zoom ratio set by the user is relatively closer to the maximum wide-angle zoom ratio of the digital photographing apparatus than to the maximum telescopic zoom ratio of the digital photographing apparatus, then the movement distance when the lens (zoom lens) moves from the position corresponding to the first zoom ratio to the position corresponding to the zoom ratio less than the first zoom ratio (the zoom ratio having a wider angle than the first zoom ratio) and then to the position corresponding to the zoom ratio greater than the first zoom ratio (the zoom ratio having a more telescopic angle than the first zoom ratio), is less than the movement distance when the lens (zoom lens) moves from the position corresponding to the first zoom ratio to the position corresponding to the zoom ratio greater than the first zoom ratio (the zoom ratio having a more telescopic angle than the first zoom ratio) and then to the position corresponding to the zoom ratio less than the first zoom ratio (the zoom ratio having a wider angle than the first zoom ratio). As such, the data regarding the first through third still images may be rapidly obtained.

Here, the digital photographing apparatus may further include a face detection unit determining whether a face is included in a still image that is obtained or to be obtained by the digital photographing apparatus. If the face detection unit detects the face, the digital photographing apparatus uses a zoom ratio including a whole face in the still image or a zoom ratio having a wider angle than the zoom ratio including the whole face in the still image, as a relatively more telescopic zoom ratio from among the second and third zoom ratios. This is because, in general, when the still image on the face is obtained, the user does not want only a portion of the face to be included in the still image but wants the whole face to be included in the still image. Thus, when the first zoom ratio is as illustrated in FIG. 2B, in order to obtain an additional image that is different from the first still image at the zoom ratio having a more telescopic angle than the first zoom ratio, the zoom ratio is set so as to include at least the whole face as illustrated in FIG. 2A.

Fifth Embodiment

A digital photographing apparatus according to a fifth embodiment of the present invention obtains data regarding a first still image at a first zoom ratio as in the digital photographing apparatus according to the third embodiment of the present invention and then, if the first zoom ratio is a maximum wide-angle zoom ratio or a zoom ratio having a wider angle than a preset wide-angle zoom ratio of the digital photographing apparatus, then a zoom ratio having a more telescopic angle than the first zoom ratio is used as a second zoom ratio and a zoom ratio having a more telescopic angle than the second zoom ratio is used as a third zoom ratio.

In more detail, if data regarding a still image is obtained at the first zoom ratio as illustrated in FIG. 2C, then a zoom ratio having a more telescopic angle than the first zoom ratio is used as the second zoom ratio so as to obtain data regarding a still image as illustrated in FIG. 2B, and a zoom ratio having a more telescopic angle than the second zoom ratio is used as the third zoom ratio so as to obtain data regarding a still image as illustrated in FIG. 2A.

Here, the digital photographing apparatus may further include a face detection unit determining whether a face is included in a still image that is obtained or to be obtained by the digital photographing apparatus. If the face detection unit detects the face, then the digital photographing apparatus uses a zoom ratio including a whole face in a still image or a zoom ratio having a wider angle than the zoom ratio including the whole face in the still image, as each of the second and third zoom ratios. This is because, in general, when the still image on the face is obtained, the user does not want only a portion of the face to be included in the still image but wants the whole face to be included in the still image.

Sixth Embodiment

A digital photographing apparatus according to a sixth embodiment of the present invention obtains data regarding a first still image at a first zoom ratio as in the digital photographing apparatus according to the third embodiment of the present invention and then, if the first zoom ratio is a maximum telescopic zoom ratio or a zoom ratio having a more telescopic angle than a preset telescopic zoom ratio of the digital photographing apparatus, then a zoom ratio having a wider angle than the first zoom ratio is used as a second zoom ratio and a zoom ratio having a wider angle than the second zoom ratio is used as a third zoom ratio.

In more detail, if data regarding a still image is obtained at the first zoom ratio as illustrated in FIG. 2A, then a zoom ratio having a wider angle than the first zoom ratio is used as the second zoom ratio so as to obtain data regarding a still image as illustrated in FIG. 2B, and a zoom ratio having a wider angle than the second zoom ratio is used as the third zoom ratio so as to obtain data regarding a still image as illustrated in FIG. 2C.

Seventh Embodiment

Figure 4:
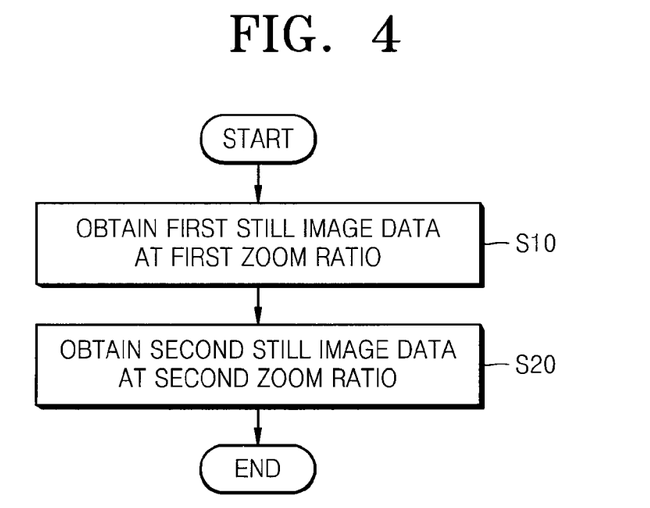
FIG. 4 is a flowchart of a method of controlling a digital photographing apparatus, according to an embodiment of the present invention.

FIG. 4 is a flowchart of a method of controlling a digital photographing apparatus having a zoom function, according to a seventh embodiment of the present invention.

Referring to FIG. 4, data regarding a first still image is obtained at a first zoom ratio in operation S10, and then data regarding a second still image is automatically obtained at a second zoom ratio that is different from the first zoom ratio, in operation S20. In this case, operation S10 may be performed in accordance with a signal input from a user, and operation S20 may be automatically performed. As such, still images may be automatically obtained at various zoom ratios and thus the user's convenience may be greatly increased.

Eighth Embodiment

Figure 5:
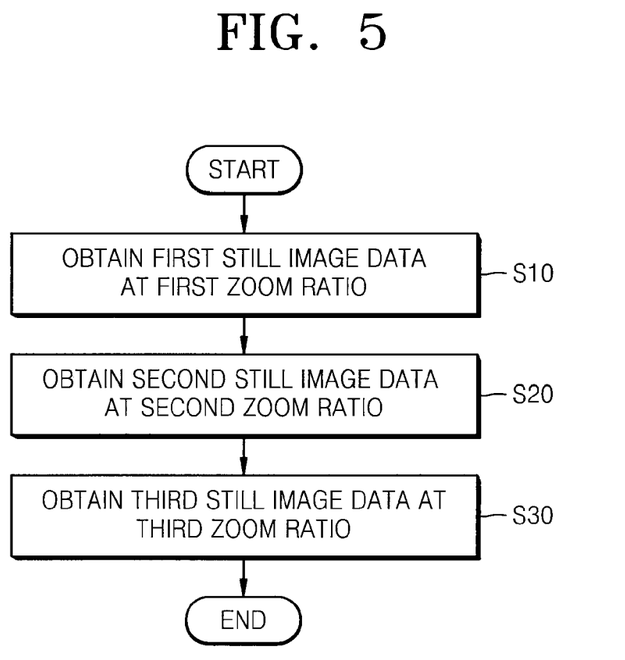
FIG. 5 is a flowchart of a method of controlling a digital photographing apparatus, according to another embodiment of the present invention.

FIG. 5 is a schematic flowchart of a method of controlling a digital photographing apparatus having a zoom function, according to an eighth embodiment of the present invention.

Referring to FIG. 5, data regarding first and second still images are respectively obtained at first and second zoom ratios as in the above method according to the seventh embodiment of the present invention, in operations S10 and S20. Then data regarding a third still image is automatically obtained at a third zoom ratio that is different from the first and second zoom ratios, in operation S30. In this case, operation S10 may be performed in accordance with a signal input from a user, and operations S20 and S30 may be automatically performed without additional signals input from the user.

Ninth Embodiment

Figure 6:
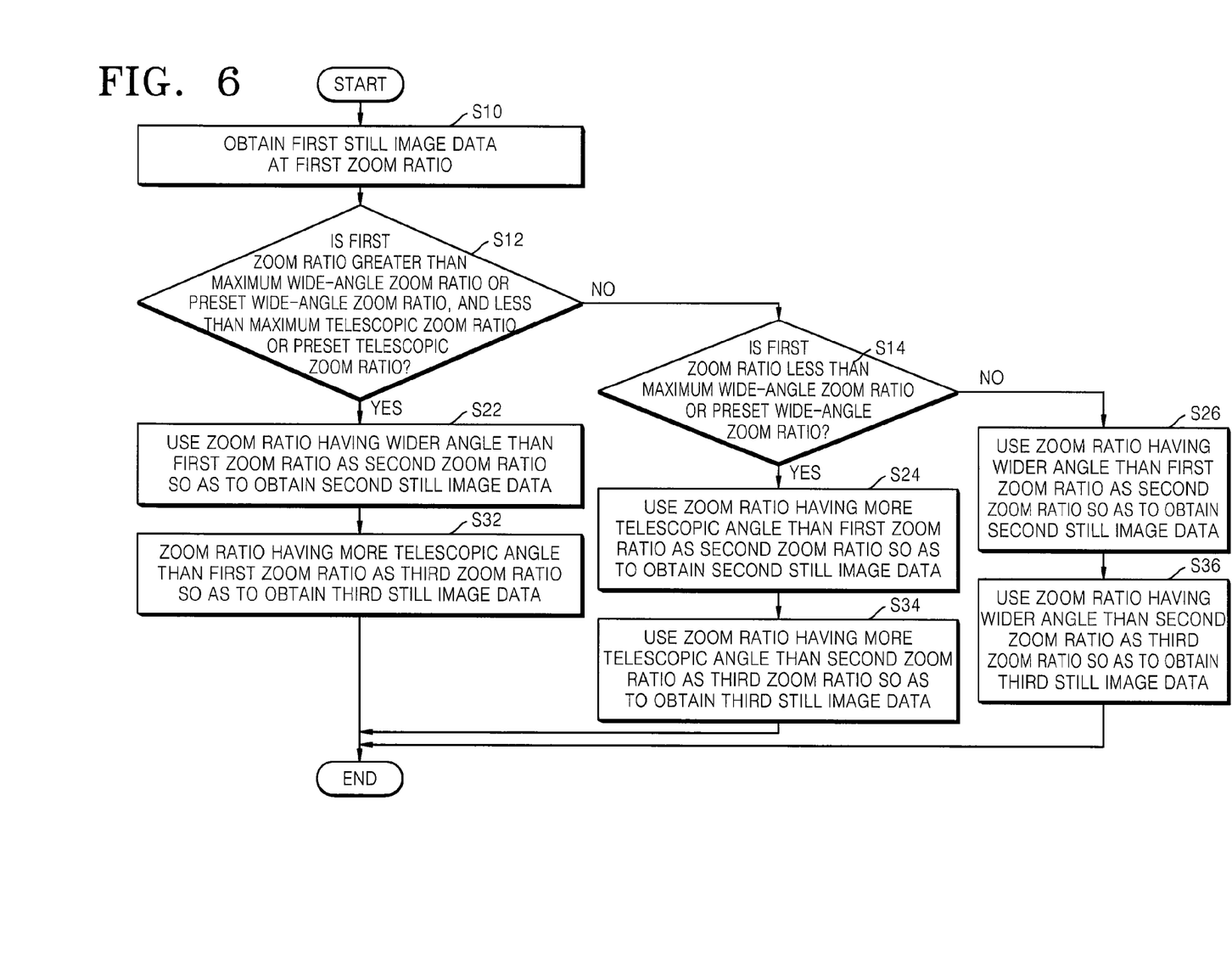
FIG. 6 is a flowchart of a method of controlling a digital photographing apparatus, according to another embodiment of the present invention.

FIG. 6 is a schematic flowchart of a method of controlling a digital photographing apparatus having a zoom function, according to a ninth embodiment of the present invention.

Referring to FIG. 6, data regarding a first still image is obtained at a first zoom ratio in operation S10, and then it is determined whether the first zoom ratio is greater than a maximum wide-angle zoom ratio or a preset wide-angle zoom ratio of the digital photographing apparatus, and is less than a maximum telescopic zoom ratio or a preset telescopic zoom ratio of the digital photographing apparatus, in operation S12. If the condition in operation S12 is determined to be true, a zoom ratio having a wider angle than the first zoom ratio is used as one of second and third zoom ratios and a zoom ratio having a more telescopic angle than the first zoom ratio is used as the other of the second and third zoom ratios, so as to obtain data regarding second and third still images. In FIG. 6, the zoom ratio having a wider angle than the first zoom ratio is used as the second zoom ratio so as to obtain the data regarding the second still image, in operation S22, and the zoom ratio having a more telescopic angle than the first zoom ratio is used as the third zoom ratio so as to obtain the data regarding the third still image, in operation S32. However, the present invention is not limited thereto.

Before or when data regarding a still image is obtained, it may be determined whether a face is included in the still image. If it is determined that the face is included in the still image, a zoom ratio including a whole face in the still image or a zoom ratio having a wider angle than the zoom ratio including the whole face in the still image may be used as a relatively more telescopic zoom ratio from among the second and third zoom ratios. This is because, in general, the user does not want only a portion of the face to be included in the still image but wants the whole face to be included in the still image.

If it is determined that the first zoom ratio is not greater than the maximum wide-angle zoom ratio or the preset wide-angle zoom ratio of the digital photographing apparatus, and is not less than the maximum telescopic zoom ratio or the preset telescopic zoom ratio of the digital photographing apparatus, in operation S12, it is determined whether the first zoom ratio is the maximum wide-angle zoom ratio or a zoom ratio having a wider angle than the preset wide-angle zoom ratio of the digital photographing apparatus, in operation S14. If the condition in operation S14 is determined to be true, the zoom ratio having a more telescopic angle than the first zoom ratio is used as the second zoom ratio so as to obtain the data regarding the second still image, in operation S24, and then a zoom ratio having a more telescopic angle than the second zoom ratio is used as the third zoom ratio so as to obtain the data regarding the third still image, in operation S34. In this case, before or when data regarding a still image is obtained, it may be determined whether a face is included in the still image. If it is determined that the face is included in the still image, a zoom ratio including a whole face in the still image or a zoom ratio having a wider angle than the zoom ratio including the whole face in the still image may be used as each of the second and third zoom ratios. This is because, in general, the user does not want only a portion of the face to be included in the still image but wants the whole face to be included in the still image.

If it is determined that the first zoom ratio is not the maximum wide-angle zoom ratio nor the zoom ratio having a wider angle than the preset wide-angle zoom ratio of the digital photographing apparatus, in operation S14, the zoom ratio having a wider angle than the first zoom ratio is used as the second zoom ratio so as to obtain the data regarding the second still image, in operation S26, and then a zoom ratio having a wider angle than the second zoom ratio is used as the third zoom ratio so as to obtain the data regarding the third still image, in operation S36.

In FIG. 6, it is determined whether the first zoom ratio is the maximum wide-angle zoom ratio or the zoom ratio having a wider angle than the preset wide-angle zoom ratio of the digital photographing apparatus, in operation S14. However, the present invention is not limited thereto and various changes may be made here. For example, it may be determined whether the first zoom ratio is the maximum telescopic zoom ratio or a zoom ratio having a more telescopic angle than the preset telescopic zoom ratio of the digital photographing apparatus, in operation S14. If the condition in operation S14 is determined to be true, the zoom ratio having a wider angle than the first zoom ratio may be used as the second zoom ratio so as to obtain the data regarding the second still image, and then a zoom ratio having a wider angle than the second zoom ratio may be used as the third zoom ratio so as to obtain the data regarding the third still image. In this case, if it is determined that the first zoom ratio is not the maximum telescopic zoom ratio nor the zoom ratio having a more telescopic angle than the preset telescopic zoom ratio of the digital photographing apparatus, in operation S14, the zoom ratio having a more telescopic angle than the first zoom ratio may be used as the second zoom ratio so as to obtain the data regarding the second still image, and then the zoom ratio having a more telescopic angle than the second zoom ratio may be used as the third zoom ratio so as to obtain the data regarding the third still image.

Tenth Embodiment

Figure 7:
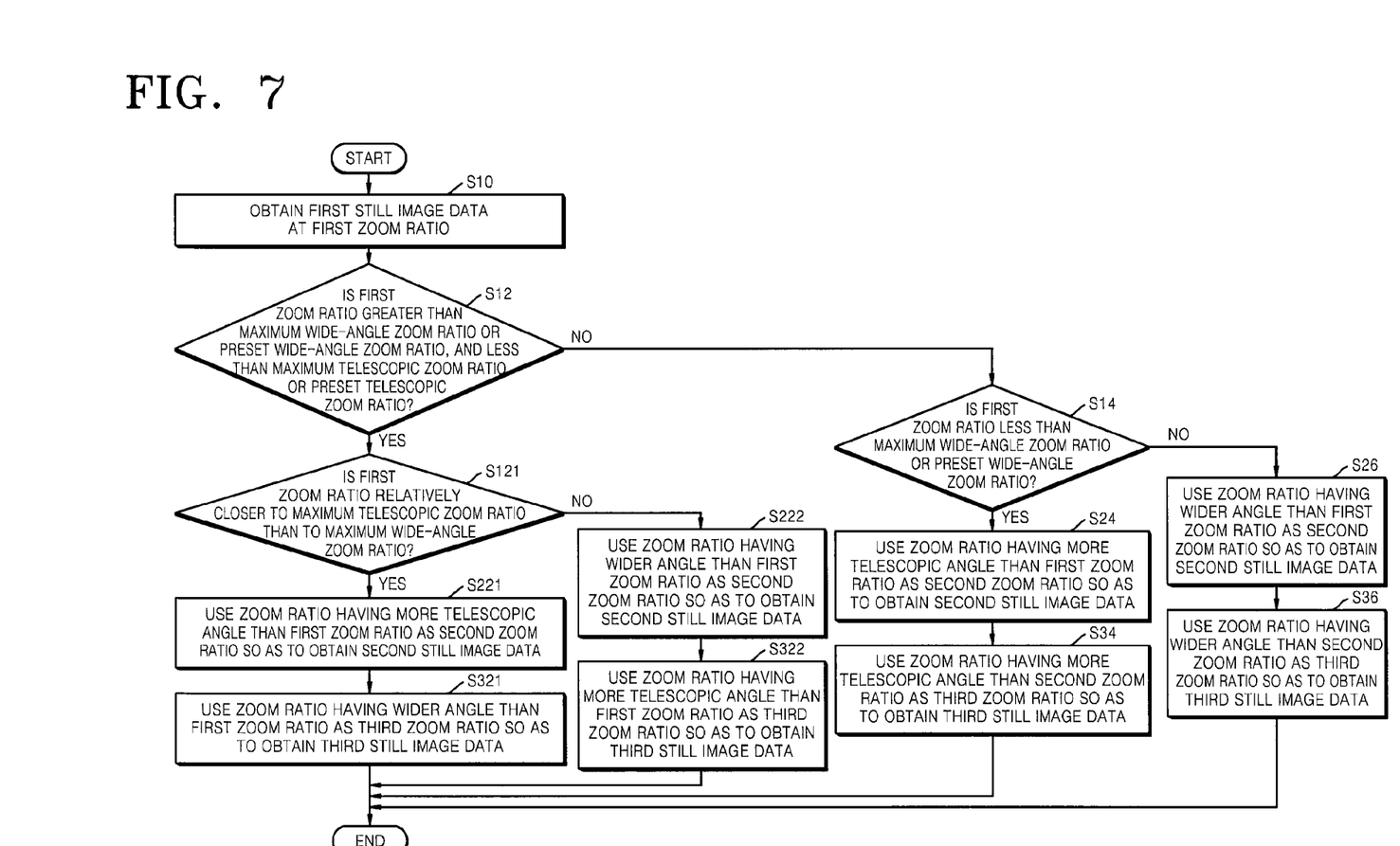
FIG. 7 is a flowchart of a method of controlling a digital photographing apparatus, according to another embodiment of the present invention.

FIG. 7 is a schematic flowchart of a method of controlling a digital photographing apparatus having a zoom function, according to a tenth embodiment of the present invention.

Referring to FIG. 7, the difference between the method according to the ninth embodiment of the present invention, which is illustrated in FIG. 6, and the method according to the current embodiment of the present invention is the process which follows operation S12.

In this case, after operation S12 is performed, the method according to the current embodiment of the present invention determines whether the first zoom ratio is relatively closer to the maximum telescopic zoom ratio of the digital photographing apparatus than to the maximum wide-angle zoom ratio of the digital photographing apparatus, in operation S121. If the condition in operation S121 is determined to be true, then a zoom ratio having a more telescopic angle than the first zoom ratio is used as a second zoom ratio so as to obtain data regarding a second still image, in operation S221, and then a zoom ratio having a wider angle than the first zoom ratio is used as a third zoom ratio so as to obtain data regarding a third still image, in operation S222. This is because such a way of changing zoom ratios minimizes the movement distance of a lens (zoom lens). If it is determined that the first zoom ratio is not relatively closer to the maximum telescopic zoom ratio of the digital photographing apparatus than to the maximum wide-angle zoom ratio of the digital photographing apparatus, in operation S121, the zoom ratio having a wider angle than the first zoom ratio is used as the second zoom ratio so as to obtain the data regarding the second still image, in operation S222, and the zoom ratio having a more telescopic angle than the first zoom ratio is used as the third zoom ratio so as to obtain the data regarding the third still image, in operation S322. This is because such a way of changing zoom ratios minimizes the movement distance of the lens (zoom lens).

Here, a change may be made to the method according to the current embodiment of the present invention and thus it may be determined whether the first zoom ratio is relatively closer to the maximum wide-angle zoom ratio of the digital photographing apparatus than to the maximum telescopic zoom ratio of the digital photographing apparatus, in operation S121. If the condition in operation S121 is determined to be true, the zoom ratio having a wider angle than the first zoom ratio is used as the second zoom ratio so as to obtain the data regarding the second still image, and then the zoom ratio having a more telescopic angle than the first zoom ratio is used as the third zoom ratio so as to obtain the data regarding the third still image. This is because such way of changing zoom ratios minimizes the movement distance of the lens (zoom lens).

On the other hand, if it is determined that the first zoom ratio is not relatively closer to the maximum wide-angle zoom ratio of the digital photographing apparatus than to the maximum telescopic zoom ratio of the digital photographing apparatus, then the zoom ratio having a more telescopic angle than the first zoom ratio is used as the second zoom ratio so as to obtain the data regarding the second still image, and the zoom ratio having a wider angle than the first zoom ratio is used as the third zoom ratio so as to obtain the data regarding the third still image. This is because such way of changing zoom ratios minimizes the movement distance of the lens (zoom lens).

In the methods described above with reference to FIGS. 4 through 7, auto-focusing is performed on a subject in order to obtain data regarding a first still image. However, when data regarding other still images, which are not the first still image, are obtained, additional auto-focusing is not performed and information on the auto-focusing performed in order to obtain the data regarding the first still image may be used. This is because, in general, if the auto-focusing is performed at each zoom ratio, the amount of time required to obtain the data regarding the other still images which are not the first still image may be dramatically increased, as described above with reference to Table 1 and FIG. 3.

A program for executing the methods of controlling a digital photographing apparatus having a zoom function, according to the above embodiments of the present invention can be stored on a recording medium. Here, the recording medium may be the memory 60 or the storage medium 70 which are illustrated in FIG. 1, or any other storage medium. Here, examples of the recording medium include magnetic storage media (e.g., ROM, floppy disks, hard disks, etc.) and optical recording media (e.g., CD-ROMs, or DVDs).

As described above, according to the present invention, a digital photographing apparatus that may easily obtain still images having various viewing angles, a method of controlling the same, and a recording medium storing a computer program for executing the method may be implemented.

Any of the processing systems may comprise a processor, a memory for storing program data and executing it, a permanent storage such as a disk drive, or memory card, a communications port for handling communications with external devices, and user interface devices. When software modules are involved, these software modules may be stored as program instructions or computer readable codes executable on the processor on a computer-readable media such as read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. This media can be read by the computer, stored in the memory, and executed by the processor.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

Numerous modifications and adaptations will be readily apparent to those skilled in this art without departing from the spirit and scope of the present invention.

What is claimed is:

1. A digital photographing apparatus, comprising:
    a zoom control that controls a zoom function;
    an input via which the photographing apparatus obtains data regarding a first still image at a first zoom ratio, then automatically obtains data regarding a second still image at a second zoom ratio that is different from the first zoom ratio, and then automatically obtains data regarding a third still image at a third zoom ratio that is different from the first and second zoom ratios, wherein:
        if the first zoom ratio
            is greater than a first preset zoom ratio that is greater than a minimum zoom ratio of the digital photographing apparatus,
            and
            is less than a second preset zoom ratio that is less than a maximum zoom ratio of the digital photographing apparatus,
        then
            one of the second and third zoom ratios is a zoom ratio less than the first zoom ratio
            and
            the other of the second and third zoom ratios is a zoom ratio greater than the first zoom ratio.

2. The digital photographing apparatus of claim 1, further comprising:
    a user input that provides a signal, wherein the data regarding the first still image is obtained in accordance with the signal, and the data regarding the second still image is obtained without an additional signal input from the user.

3. The digital photographing apparatus of claim 1, wherein the data regarding the first still image is obtained in accordance with a signal input from a user, and the data regarding the second and third still images are obtained without additional signals input from the user.

4. The digital photographing apparatus of claim 1, wherein, if the first zoom ratio
    is greater than the first preset zoom ratio of the digital photographing apparatus,
    and
    is less than the second preset zoom ratio of the digital photographing apparatus,
    and
    is relatively closer to the maximum zoom ratio of the digital photographing apparatus than to the minimum zoom ratio of the digital photographing apparatus,
    then
    the zoom ratio greater than the first zoom ratio is used as the second zoom ratio and the zoom ratio less than the first zoom ratio is used as the third zoom ratio.

5. The digital photographing apparatus of claim 1, wherein, if the first zoom ratio
    is greater than the first preset zoom ratio of the digital photographing apparatus,
    and
    is less than the second preset zoom ratio of the digital photographing apparatus,
    and
    is relatively closer to the minimum zoom ratio of the digital photographing apparatus than to the maximum zoom ratio of the digital photographing apparatus,
    then
    the zoom ratio less than the first zoom ratio is used as the second zoom ratio and the zoom ratio greater than the first zoom ratio is used as the third zoom ratio.

6. The digital photographing apparatus of claim 1, further comprising:
    a face detection unit that determines whether a face is included in the first still image that is obtained or to be obtained,
    wherein, if the face detection unit detects the face, then the second and third zoom ratios are the same as or less than the zoom ratio including a whole face in the first still image.

7. The digital photographing apparatus of claim 1, wherein, if the first zoom ratio is a zoom ratio less than the first preset zoom ratio of the digital photographing apparatus,
    then a zoom ratio greater than the first zoom ratio is used as the second zoom ratio and a zoom ratio greater than the second zoom ratio is used as the third zoom ratio.

8. The digital photographing apparatus of claim 7, further comprising:
    a face detection unit that determines whether a face is included in the first still image that is obtained or to be obtained,
    wherein, if the face detection unit detects the face, a zoom ratio including a whole face in the first still image or a zoom ratio less than the zoom ratio including the whole face in the first still image is used as each of the second and third zoom ratios.

9. The digital photographing apparatus of claim 1, wherein, if the first zoom ratio is a zoom ratio greater than the second preset zoom ratio of the digital photographing apparatus, a zoom ratio less than the first zoom ratio is used as the second zoom ratio and a zoom ratio less than the second zoom ratio is used as the third zoom ratio.

10. The digital photographing apparatus of claim 1, further comprising:
an auto-focuser via which auto-focusing is performed on a subject when the data regarding the first still image is obtained, and
wherein, when data regarding another still image that is not the first still image is obtained, additional auto-focusing is not performed and information on the auto-focusing performed when the data regarding the first still image is obtained is used.

11. A method of controlling a digital photographing apparatus having a zoom function, the method comprising:
(a) initially obtaining data regarding a first still image at a first zoom ratio;
(b) automatically obtaining data regarding a second still image at a second zoom ratio that is different from the first zoom ratio, after (a) the initially obtaining data is performed; and
(c) further automatically obtaining data regarding a third still image at a third zoom ratio that is different from the first and second zoom ratios, after (b) the automatically obtaining data is performed; wherein,
if the first zoom ratio
is greater than a first preset zoom ratio that is greater than a minimum zoom ratio of the digital photographing apparatus,
and
is less than a second preset zoom ratio that is less than a maximum zoom ratio of the digital photographing apparatus,
then
one of the second and third zoom ratios is a zoom ratio less than the first zoom ratio
and
the other of the second and third zoom ratios is a zoom ratio greater than the first zoom ratio.

12. The method of claim 11, wherein (a) the initially obtaining data is performed in accordance with a signal input from a user, and (b) the automatically obtaining data is performed without an additional signal input from the user.

13. The method of claim 11, wherein (a) the initially obtaining data is performed in accordance with a signal input from a user, and (b) the automatically obtaining data and (c) the further automatically obtaining data are performed without additional signals input from the user.

14. The method of claim 11, wherein,
if the first zoom ratio
is greater than the first preset zoom ratio of the digital photographing apparatus,
and
is less than the second preset zoom ratio of the digital photographing apparatus,
and
is relatively closer to the maximum zoom ratio of the digital photographing apparatus than to the minimum zoom ratio of the digital photographing apparatus,
then
the zoom ratio greater than the first zoom ratio is used as the second zoom ratio and the zoom ratio less than the first zoom ratio is used as the third zoom ratio.

15. The method of claim 11, wherein,
if the first zoom ratio
is greater than the first preset zoom ratio of the digital photographing apparatus,
and
is less than the second preset zoom ratio of the digital photographing apparatus,
and
is relatively closer to the minimum zoom ratio of the digital photographing apparatus than to the maximum zoom ratio of the digital photographing apparatus,
then
the zoom ratio less than the first zoom ratio is used as the second zoom ratio and the zoom ratio greater than the first zoom ratio is used as the third zoom ratio.

16. The method of claim 11, further comprising:
determining whether a face is included in the first still image, before or when data regarding the first still image is obtained,
wherein, if it is determined that the face is included in the first still image, then the second and third zoom ratios are the same as or less than the zoom ratio including a whole face in the first still image.

17. The method of claim 11, wherein,
if the first zoom ratio is a zoom ratio less than the first preset zoom ratio of the digital photographing apparatus,
then a zoom ratio greater than the first zoom ratio is used as the second zoom ratio and a zoom ratio greater than the second zoom ratio is used as the third zoom ratio.

18. The method of claim 17, further comprising:
determining whether a face is included in the first still image, before or when data regarding the first still image is obtained,
wherein, if it is determined that the face is included in the first still image, then a zoom ratio including a whole face in the first still image or a zoom ratio less than the zoom ratio including the whole face in the first still image is used as each of the second and third zoom ratios.

19. The method of claim 11, wherein,
if the first zoom ratio is a zoom ratio greater than the second preset zoom ratio of the digital photographing apparatus, then a zoom ratio less than the first zoom ratio is used as the second zoom ratio and a zoom ratio less than the second zoom ratio is used as the third zoom ratio.

20. The method of claim 11, wherein (a) the initially obtaining data comprises performing auto-focusing on a subject,
wherein additional auto-focusing is not performed and information on the auto-focusing performed in (a) the initially obtaining data is used when data regarding a still image is obtained in another operation that is not (a) the initially obtaining data.

21. A non-transitory computer-readable storage medium that stores a computer program for executing a method of controlling a digital photographing apparatus having a zoom function, the method comprising:
(a) initially obtaining data regarding a first still image at a first zoom ratio;

(b) automatically obtaining data regarding a second still image at a second zoom ratio that is different from the first zoom ratio, after (a) the initially obtaining data is performed; and (c) further automatically obtaining data regarding a third still image at a third zoom ratio that is different from the first and second zoom ratios, after (b) the automatically obtaining data is performed; wherein, if the first zoom ratio is greater than a first preset zoom ratio that is greater than a minimum zoom ratio of the digital photographing apparatus, and is less than a second preset zoom ratio that is less than a maximum zoom ratio of the digital photographing apparatus, then one of the second and third zoom ratios is a zoom ratio less than the first zoom ratio and the other of the second and third zoom ratios is a zoom ratio greater than the first zoom ratio.

* * * * *